(12) United States Patent
Mo et al.

(10) Patent No.: US 8,643,750 B2
(45) Date of Patent: Feb. 4, 2014

(54) REDUCING NOISE IN IMAGE SENSORS BY CONCURRENTLY READING RESET AND IMAGE SIGNAL LEVELS FROM ACTIVE AND REFERENCE PIXELS

(75) Inventors: Yaowu Mo, San Ramon, CA (US); Chen Xu, San Jose, CA (US)

(73) Assignee: OmniVision Technologies, Inc., Santa Clara, CA (US)

( * ) Notice: Subject to any disclaimer, the term of this patent is extended or adjusted under 35 U.S.C. 154(b) by 17 days.

(21) Appl. No.: 12/930,015

(22) Filed: Dec. 22, 2010

(65) Prior Publication Data

US 2012/0162484 A1 Jun. 28, 2012

(51) Int. Cl.
*H04N 5/217* (2011.01)
*H04N 5/235* (2006.01)

(52) U.S. Cl.
USPC ........................................ 348/241; 348/222.1

(58) Field of Classification Search
USPC ................................ 348/241, 243, 245, 222.1
See application file for complete search history.

(56) References Cited

U.S. PATENT DOCUMENTS

2005/0168607 A1* 8/2005 Han ............................... 348/308
2005/0243193 A1* 11/2005 Gove et al. .................... 348/241
2009/0073274 A1  3/2009 Dai
2009/0190005 A1* 7/2009 Mo et al. ...................... 348/241
2009/0201393 A1* 8/2009 Tai et al. ....................... 348/243
2009/0272879 A1  11/2009 Dai
2011/0309232 A1* 12/2011 Lyu ............................ 250/208.1

FOREIGN PATENT DOCUMENTS

EP          1349380         2/2006

OTHER PUBLICATIONS

Jun, Gao et al., "Correlated Double Sample Design for CMOS Image Readout IC". Institute of Microelectronics, pp. 1437-1440, (2004).
Suh, Sungho et al., "Column-Parallel Correlated Multiple Sampling Circuits for CMOS Image Sensors and Their Noise Reducton Effects", www.mpdi.com/journal/sensors, ISSN 1424-8220, pp. 9140-9154, (2010).

* cited by examiner

*Primary Examiner* — Joel Fosselman
(74) *Attorney, Agent, or Firm* — Blakely Sokoloff Taylor & Zafman LLP

(57) ABSTRACT

A method of one aspect includes reading a reset level of an active pixel, and concurrently, reading a reset level of a reference pixel. The method also includes reading an image signal level of the active pixel, and concurrently, reading an image signal level of the reference pixel. A reduced noise image signal level of the active pixel is generated based on the reset levels and the image signal levels of the active and reference pixels. Other methods are disclosed as well as apparatus and systems.

30 Claims, 11 Drawing Sheets

REDUCING NOISE IN IMAGE SENSORS BY CONCURRENTLY READING RESET AND IMAGE SIGNAL LEVELS FROM ACTIVE AND REFERENCE PIXELS

BACKGROUND

1. Field

This disclosure relates generally to image sensors, and in particular but not exclusively, relates to reducing noise in image sensors.

2. Background Information

Image sensors are prevalent. They are widely used in digital still cameras, digital video cameras, camera phones, picture phones, video phones, camcorders, webcams, computer system cameras, security cameras, medical imaging devices, optical mice, toys, games, scanners, automotive image sensors, as well as other types of electronic image acquisition devices.

One significant factor that may limit the quality of the images and/or video acquired by an image sensor is the amount of noise that is present. Various factors may contribute to noise, such as variations in temperature, fluctuations or noise in electrical signal, variations in circuitry of the image sensor, etc.

Correlated double sampling (CDS) is a known noise reduction technique commonly used in image sensors to help reduce the amount of noise and improve image and/or video quality. CDS may help to reduce certain types of noise such as fixed pattern noise (FPN), reset noise, thermal noise in capacitors or capacitive structures referred to as kTC noise, and flicker (1/f) noise.

FIG. 1 is a block diagram illustrating a known CDS technique. As shown in the illustration, a reset level of a given pixel may be read at a first time 101. The reset level may represent a voltage level on a column readout line or bit line after the given pixel has been reset and while the given pixel is still in the reset state.

As further shown, an image signal level of the same given pixel may be read at a second, different time 102. The image signal level may represent a voltage level on the column readout line or bit line when the image data from the same pixel is transferred to the column line or bit line for readout.

The reset level of the given pixel read at the first time 101, and the image signal level of the same given pixel read at the second, different time 102, are provided to a correlated double sampling (CDS) circuit 103. The CDS circuit subtracts the reset level of the given pixel read at the first time from the image signal level of the same given pixel read at the second, different time. The subtraction of these levels helps to cancel or reduce part of the noise that is "correlated" between the reset and signal samples. The CDS circuit outputs a reduced noise image signal 104.

BRIEF DESCRIPTION OF THE SEVERAL VIEWS OF THE DRAWINGS

The invention may best be understood by referring to the following description and accompanying drawings that are used to illustrate embodiments of the invention. In the drawings.

DETAILED DESCRIPTION

Figure 1:
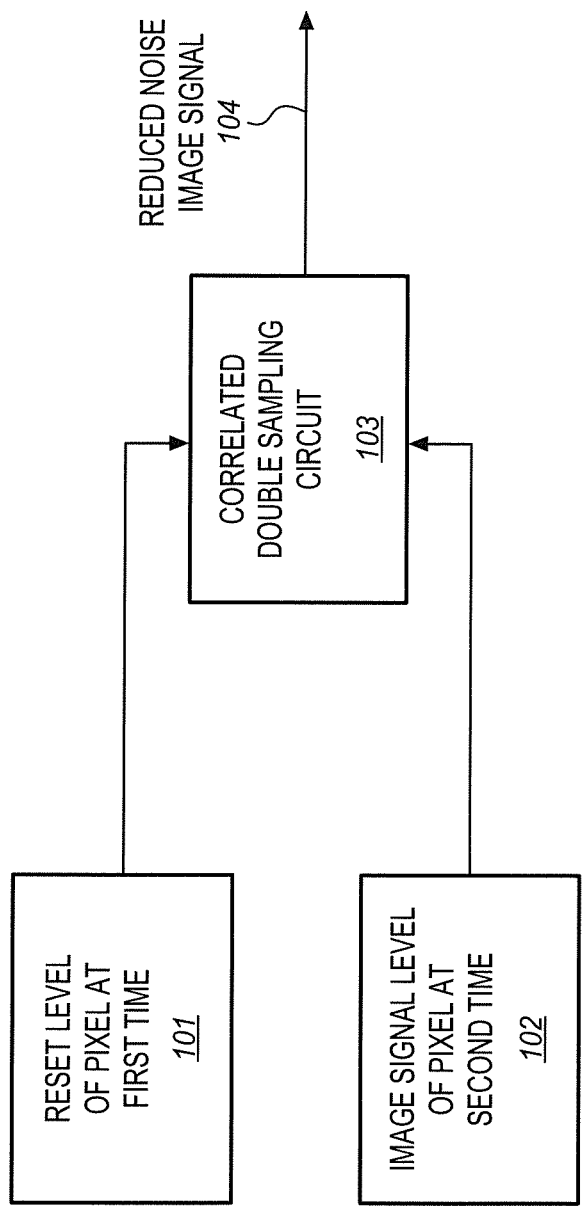
FIG. 1 is a block diagram illustrating a known CDS technique.

In the following description, numerous specific details, such as, for example, specific circuitry, specific timings, specific types of noise, specific sequences of operations, and specific logical partitioning/integration decisions, are set forth. However, it is understood that embodiments of the invention may be practiced without these specific details. In other instances, well-known circuits, structures and techniques have not been shown in detail in order not to obscure the understanding of this description.

One drawback to known correlated double sampling (CDS) techniques is that they do not adequately remove noise that is "uncorrelated" between a reset level of a given pixel read at a first time and an image signal level of the same given pixel read at a second, different time. Significantly, noise may be uncorrelated between the reset and image signal levels due at least in part to the difference in time between when these levels are read. Intervening power level disturbances or fluctuations, variations in reference voltages, variations in clock signals, and variations in other electrical signals may occur between the times that these voltage levels are read. Such variations or fluctuations may contribute noise that is uncorrelated between the reset and image signal levels read at these two different discrete times. This uncorrelated noise may not be removed or adequately removed by known CDS techniques.

Additionally, this uncorrelated part of the noise may lead to row-wise temporal noise, which is a form of structural noise. Since all of the pixels in a given row of a pixel array may share certain signals, such as reference voltages, clock signals, etc., all of the pixels in the given row may be affected by such fluctuations or variations. As a result, the uncorrelated noise may represent row-wise temporal noise that affects all of the pixels in the given row. This may potentially cause a whole row of pixels in an image or video to be erroneously bright, dark, or otherwise altered. Such structural row-wise temporal noise tends to be more problematic than pixel-wise temporal noise, since human eyes tend to perceive structural row-wise noise more readily than pixel-wise noise. Moreover, as the overall level of noise is reduced (e.g., by approaches such as CDS), the uncorrelated part of the noise becomes relatively more significant, especially at low light levels. Accordingly, methods and apparatus that help to reduce noise that is uncorrelated between reset and image signal levels sampled at different times and/or help to reduce row-wise temporal noise in images and video would be useful.

Disclosed herein are methods and apparatus to reduce noise in image sensors by concurrently reading reset and image signal levels from active and reference pixels. Advantageously, sampling or reading the reset and image signal levels concurrently from the active and reference pixels may help to reduce the aforementioned uncorrelated noise and/or reduce row-wise temporal noise that would otherwise remain after CDS. It is to be appreciated that while embodiments of the invention are applicable to CDS (inclusive of improvements, extensions, advances, variations, and future versions of CDS), still other embodiments are related to other noise reduction schemes, such as, for example, Clamp and Track/Hold (CTH) approaches, auto-zero or offset-cancellation/compensation, and more other noise reduction schemes for image sensors that read a reset signal and an image signal level.

Figure 2:
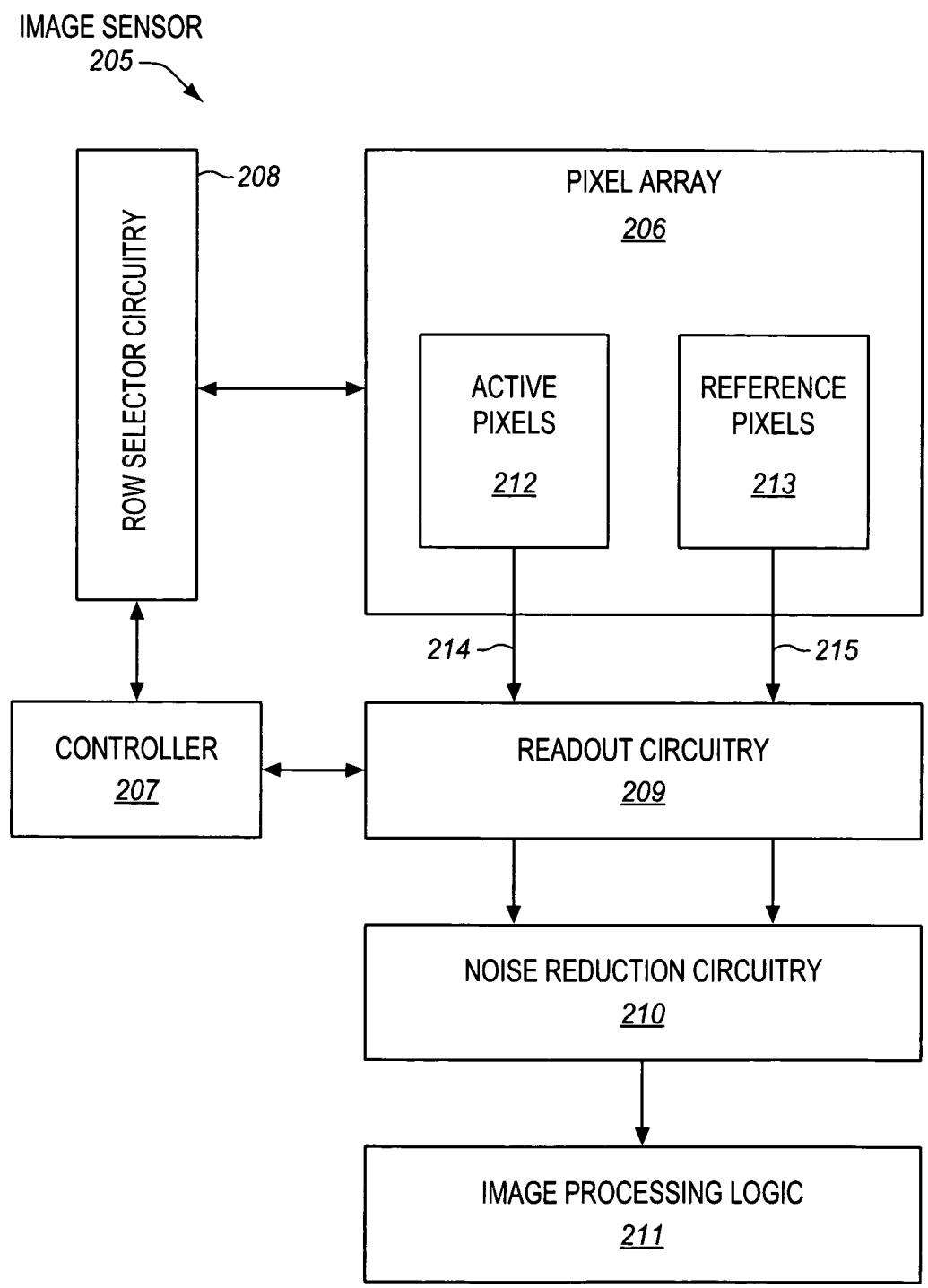
FIG. 2 is a block diagram of an example embodiment of an image sensor.

FIG. 2 is a block diagram of an example embodiment of an image sensor 205. The illustrated image sensor includes a pixel array 206, a controller 207, a row selector circuitry 208, a readout circuitry 209, a noise reduction circuitry 210, and image processing logic 211.

The pixel array 206 includes a two-dimensional array of pixels. The pixel array may also be referred to as an image sensor array, an array of photosensitive regions, an array of photosensitive sites, etc. The pixels of the array are typically arranged in rows and columns. Commonly there are numerous rows and numerous columns, for example, to provide millions. The pixel array may be used to acquire image data (e.g., of a person, place, or object), which may then be used to render a two-dimensional (2D) image (e.g., of the person, place, or object). During image acquisition, when the pixel array is exposed to light, each of the pixels may potentially acquire image data (e.g., an image charge). In one embodiment, each pixel is a complementary metal oxide semiconductor (CMOS) pixel or other pixel for an active-pixel sensor (APS). In another embodiment, each pixel is a charge coupled device (CCD) pixel. The image sensor array may either be implemented as a front side illuminated (FSI) image sensor array or a backside illuminated image sensor array. In one embodiment where a color image is desired, the image sensor array may include a color filter pattern, such as a Bayer pattern or mosaic of red (R), green (G), and blue (B) additive filters (e.g., RGB, RGBG or GRGB), a color filter pattern of cyan (C), magenta (M), yellow (Y), and key (K) (e.g., black) subtractive filters (e.g., CMYK), a combination of both, or another type of color filter pattern. Referring again to FIG. 2, notice that the pixel array includes both active pixels 212 that are used to acquire image charge or data associated with an image or video, as well as reference pixels 213. Example embodiments of reference pixels will be disclosed further below.

The controller 207 (e.g., control circuitry) is coupled to the pixel array to control operational characteristics of the pixel array. For example, the control circuitry may generate a shutter signal for controlling image acquisition. In one embodiment, the shutter signal is a global shutter signal for simultaneously enabling all pixels within the image sensor array to concurrently capture their respective image data or charge during a single acquisition window or exposure period. Alternatively, the shutter signal may be a rolling shutter signal, where each row, column, or other subset of pixels is sequentially enabled to acquire its respective image data or charge during consecutive acquisition windows.

After each pixel has acquired its image data or image charge, the image data is readout by the readout circuitry 209. Several approaches are available for selecting the order in which the pixels in the pixel array are readout by the readout circuit. In one embodiment, the controller 207 may cause the row selector circuitry 208 to select a row for readout and the readout circuitry 209 may readout all of the active pixels in the selected row concurrently and in parallel along readout column lines 214 and the reference pixels along reference pixel readout lines 215 Alternatively, in other embodiments the image data may be readout using another approach, such as a serial readout of individual pixels, or a full parallel readout of all pixels concurrently. Example embodiments of readout circuitry to concurrently readout reset levels and image signal levels from the active pixels 212 and reference pixels 213 will be disclosed further below.

The readout circuitry 209 may provide the readout data from the pixel array to noise reduction circuitry 210. The noise reduction circuitry may reduce the noise in the data. In embodiments, the noise reduction circuitry may reduce noise based on reset and image signal levels concurrently readout from the active 212 pixels and the reference pixels 213 of the pixel array. In various embodiments, the noise reduction circuitry may use noise reduction techniques based on CDS, Clamp and Track/Hold (CTH), or auto-zero or offset-cancellation/compensation, but modified to use the reset and image signal levels read concurrently, as disclosed herein.

The noise reduction circuitry may provide reduced noise representations of the image data from the active pixels of the array to the image processing logic 211. In one aspect, the image processing logic may manipulate the image data using any of various ways of manipulating image data output from the noise reduction circuitry known in the arts. A few representative examples include applying one or more post image effects, such as, for example, crop, rotate, remove red eye, adjust brightness, adjust contrast, etc. The image processing logic may be performed in hardware, software, or a combination thereof.

In one embodiment, the pixel array, the controller, the row selector circuitry, the readout circuitry, the noise reduction circuitry, and potentially some of the further processing logic may be monolithically integrated on a single die or substrate. Alternatively, some of this logic may be off-die relative to the image sensor array (e.g., at least some of the further processing logic may not be on-die with the pixel array).

In one embodiment, the image sensor system may be included in a digital still camera, digital video camera, camera phone, picture phone, video phone, camcorder, webcam, camera in a computer system, security camera, medical imaging device, optical mouse, toy, game, scanner, automotive image sensor, or other types of electronic image and/or video acquisition device. Depending on the implementation, the electronic image acquisition device may also include other components, such as, for example, a light source to emit light, one or more lenses optically coupled to focus light on the array of pixels, a shutter optically coupled to allow light to pass through the one or more lenses, a processor to process image data, and a memory to store image data, to name just a few examples.

Figure 3:
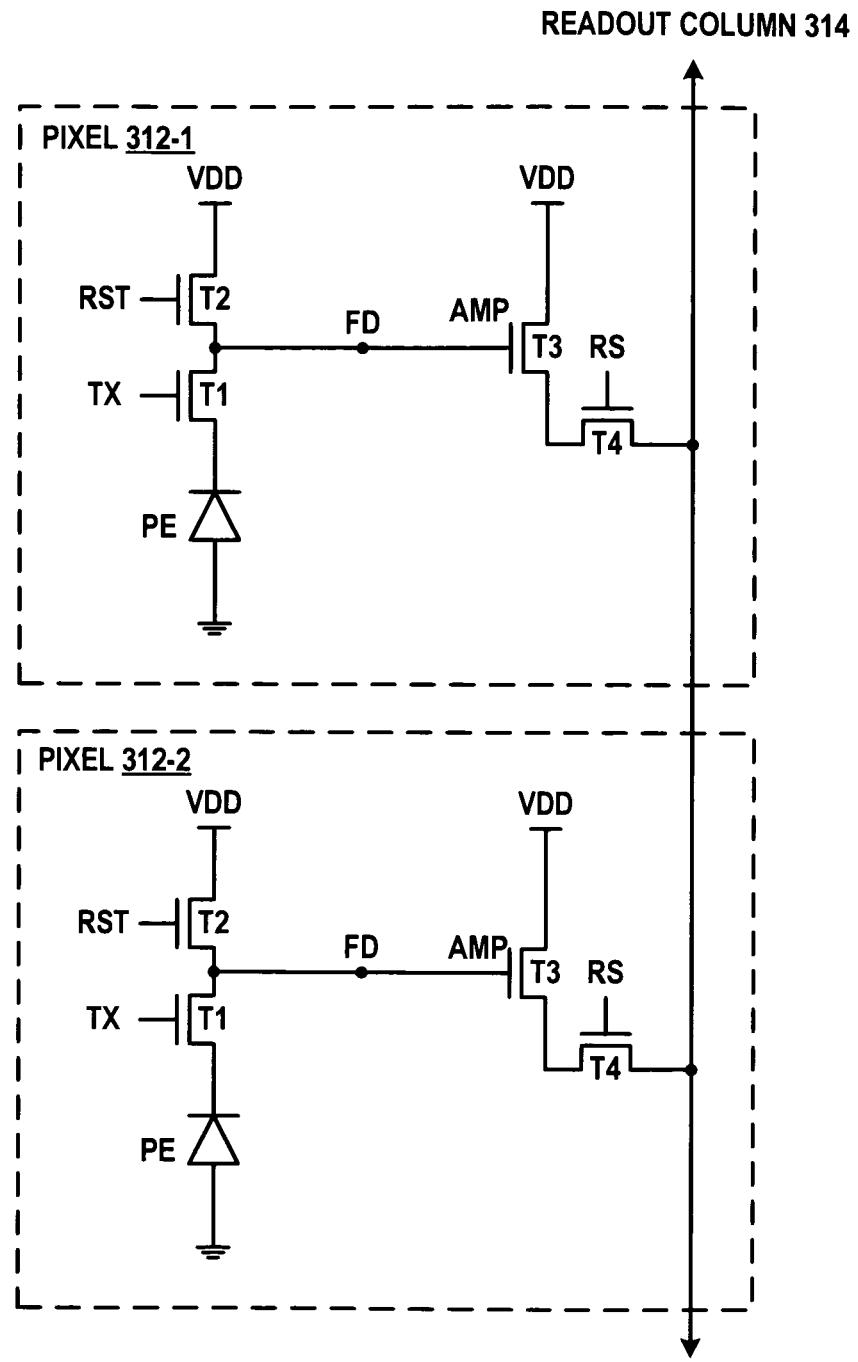
FIG. 3 is a circuit diagram illustrating an example embodiment of pixel circuitry for two four-transistor (4T) pixels for a pixel array or image sensor array.

FIG. 3 is a circuit diagram illustrating an example embodiment of pixel circuitry for two four-transistor (4T) pixels 312-1 and 312-2 within a pixel array or image sensor array. The pixel circuitry is only one example of suitable pixel circuitry, and the scope of the invention is not limited to this particular pixel circuitry. Other pixel circuitry for other 4T pixels, as well as other pixel circuitry for pixels with fewer or more than four transistors is also suitable, including where one or more transistors are shared by two or more pixels. The pixel circuitry may be implemented in the pixel array 206 of FIG. 2, or an entirely different pixel array.

The pixels 312-1 and 312-2 are arranged in two rows and one column and time share a readout column line 314. The readout column line or column line is also sometimes referred to as a bit line. All of the pixels of a given column may be coupled with a column line or bit line and this line may be used to read out voltages corresponding to image charges or data from the pixels of that column. Each of the pixels includes a photosensitive element PE, a transfer transistor T1, a reset transistor T2, a source-follower or amplifier (AMP) transistor T3, a row select transistor T4, and a floating diffusion node FD. Examples of suitable photosensitive elements PEs include, but are not limited to, photodiodes (e.g., pinned photodiodes), charge-coupled devices (CCDs), quantum device optical detectors, photogates, phototransistors, and photoconductors. Photosensitive elements PEs used in complementary metal oxide semiconductor (CMOS) active-pixel sensors (APS) are believed to be especially suitable. In one aspect, the photosensitive element is a pinned photodiode. The floating diffusion node FD is a circuit node that is operable to receive and hold a charge.

In an example mode of operation, according to one embodiment, the reset transistor T2 may reset the corresponding pixel (e.g., discharge or charge the floating diffusion node FD and the photosensitive element PE to a preset voltage) under control of a reset signal RST applied to the reset transistor T2. The reset transistor T2 is coupled between a supply voltage VDD (e.g., a power rail) and the floating diffusion node FD. The photosensitive element PE and the floating diffusion node FD may be reset to substantially the supply voltage VDD by temporarily asserting the reset signal RST to the reset transistor T2 and by asserting a transfer signal TX to a transfer gate of the transfer transistor T1. In embodiments disclosed herein, such a reset level or voltage after the assertion of the reset signal RST may be read on the column readout line and used for noise reduction.

The image accumulation window or exposure period may be commenced by de-asserting the transfer signal TX and permitting incident light to expose the photodiode or other photosensitive element PE. The photosensitive element PE is operable to generate an electrical charge in response to light applied to or received by the photosensitive element PE. For example, the incident light on the photosensitive element PE may generate electrons known as photogenerated electrons. As photogenerated electrons accumulate on the photosensitive element PE, its voltage may decrease, since electrons are negative charge carriers. The amount of voltage or charge accumulated on the photosensitive element PE may be indicative of the amount and/or intensity of the light incident on the photosensitive element PE during the exposure period, and may represent image data for the pixel.

At the end of the exposure period, the reset signal RST may be de-asserted to isolate the floating diffusion node FD. The transfer signal TX may again be asserted on the transfer gate of the transfer transistor T1 to transfer the charge accumulated on the photosensitive element PE to the floating diffusion node FD. The charge transfer may cause the voltage of the floating diffusion node FD to drop from the supply voltage VDD to a second voltage that is indicative of the image data or charge (e.g., the photogenerated electrons accumulated on the photosensitive element PE during the exposure period). The floating diffusion node FD is coupled to control a gate terminal of the AMP transistor T3. This second voltage on the FD node may bias the AMP transistor T3. AMP transistor T3 operates as a source-follower transistor providing a high impedance connection to the floating diffusion FD. The AMP transistor may provide an amplified voltage corresponding to the image charge on the floating diffusion node FD.

The AMP transistor T3 is coupled between the voltage supply VDD and the row select transistor T4. The AMP transistor T3 has a gate terminal coupled to the floating circuit node FD and a channel terminal coupled to the column line or bit line 314. The AMP transistor T3 is coupled to the column line when the row select signal RS is asserted on the row select transistor T4. The row select transistor T4 selectively couples the output of the pixel to the column line when the row select signal RS is applied to the row select transistor T4. In embodiments disclosed herein, such a voltage output from the pixel on the column line or bit line for an active pixel, which is reflective of the image charge, may represent an image signal level for the active pixel that is used for noise reduction.

For purposes of illustration, a particular example of circuitry for 4T pixels have been shown and described. Different circuitry for 4T pixels are also suitable, as well as circuitry for pixels with other numbers of transistors. In one or more embodiments, one or more of a reset transistor, a source-follower transistor, and a row select transistor, may be shared by two or more pixels.

Figure 4:
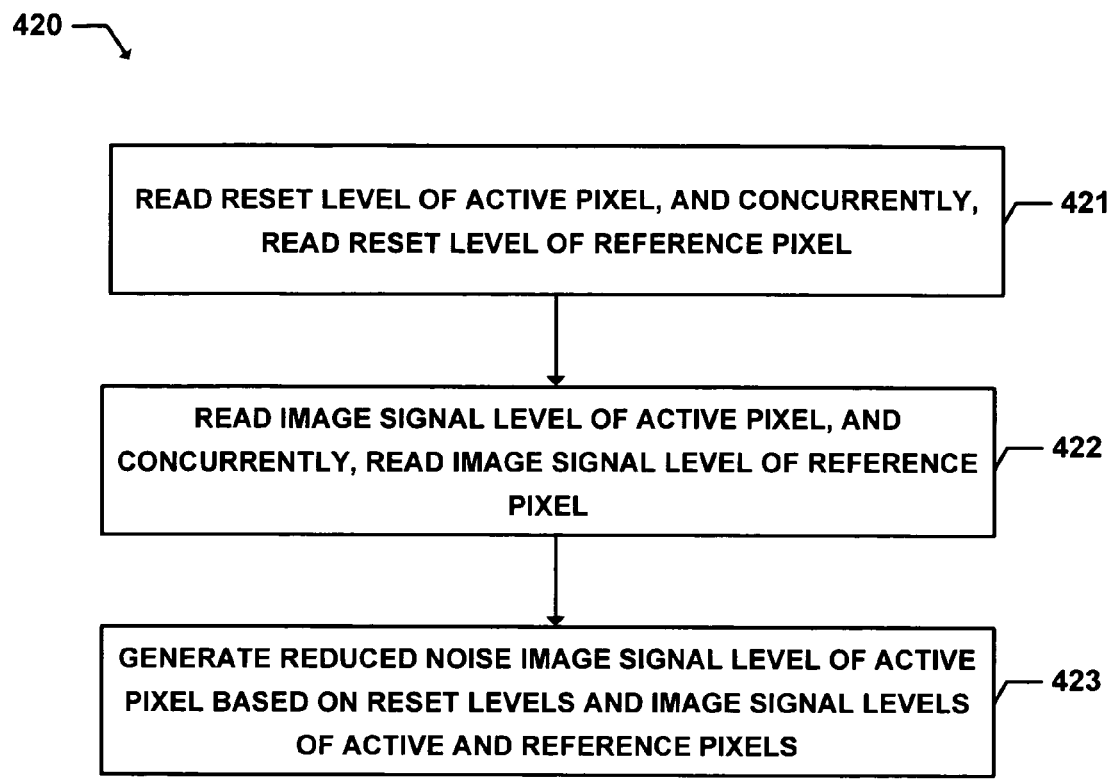
FIG. 4 is a block flow diagram of an example embodiment of a method to reduce noise in an image signal level of an active pixel of an image sensor.

FIG. 4 is a block flow diagram of an example embodiment of a method 420 to reduce noise in an image signal level of an active pixel of an image sensor. In one embodiment, the method 420 may be performed by the image sensor 205 of FIG. 2, or a similar image sensor. Alternatively, the method 420 may be performed by an image sensor entirely different than the image sensor 205 of FIG. 2.

A reset level of the active pixel is read, at block 421. Concurrently, a reset level of a reference pixel is also read, at block 421. In one embodiment, the reset levels may represent the voltages on the readout lines (e.g., the column line or bit line for the active pixel and the reference pixel readout line for the reference pixel) after the pixels have been reset (e.g., after a reset signal RST has been applied) and before an image signal or charge has been transferred from a photosensitive element (e.g., before a transfer signal TX has been applied to transfer the charge from the photosensitive element).

An image signal level of the active pixel is read, at block 422. Concurrently, an image signal level of the reference pixel is also read, at block 422. In one embodiment, the image signal levels may represent the voltages on the readout lines (e.g., the column line or bit line for the active pixel) when voltages are transferred from the pixels to the readout lines to transfer image data from the active pixels. For example, the read may be after a transfer signal TX has been applied to transfer an image charge from a photosensitive element PE to a floating diffusion node FD, and while a row select signal is applied to a row select transistor to cause an amplified voltage indicative of the image charge to be transferred from the pixel to the readout line.

Advantageously, by reading the reset levels of the active and reference pixels concurrently, the amount of temporally uncorrelated noise (e.g., as might occur due to variations or fluctuations in electrical signals occurring over time) may be significantly reduced, at least compared to the amount of temporally uncorrelated noise between the reset and image signal levels sampled at different times in conventional CDS. Similarly, by reading the image signal levels of the active and reference pixels concurrently, the amount of temporally uncorrelated noise may be significantly reduced. For improved clarity, as used herein, the levels are read "concurrently" if the reading of the levels overlaps at least partly in time (e.g., even if there is only a very small amount of overlap in time between the reading of the two levels). In one example, the two levels may be read concurrently on the same edge of a de-assertion of an electrical signal.

Referring again to FIG. 4, a reduced noise image signal level of the active pixel is generated based on the reset levels and the image signal levels of the active and reference pixels, at block 423. Four values, namely the two reset levels read concurrently and the two image signal levels read concurrently, instead of just two values conventionally used in CDS, may be used to cancel noise. Advantageously, due to the increased amount of correlated noise (or the decreased amount of temporally uncorrelated or row-wise temporal noise) between the four values, embodiments of methods and apparatus disclosed herein may tend to cancel out more overall noise and may help to reduce the amount of row-wise or structural temporal noise in images or video. This may help to improve quality of images and video.

Figure 5:
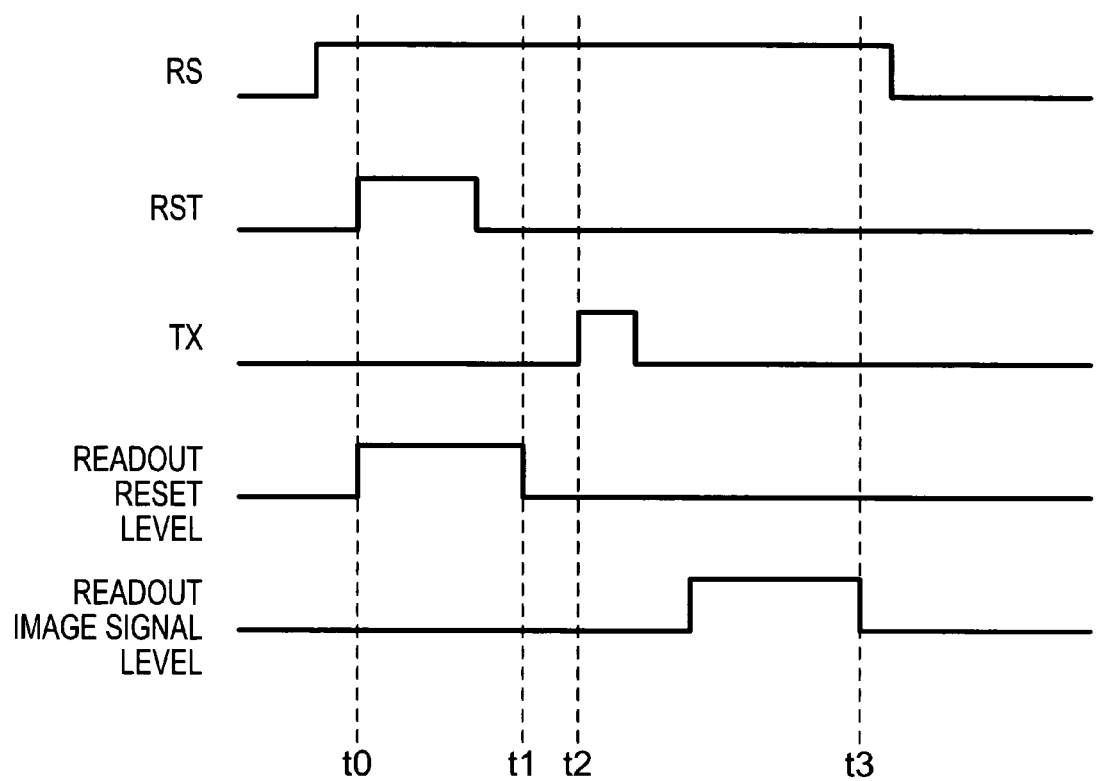
FIG. 5 is a timing diagram illustrating an example embodiment of suitable timing for reading or sampling reset levels and image signal levels.

FIG. 5 is a timing diagram illustrating an example embodiment of suitable timing for reading or sampling reset levels and image signal levels. Time is plotted on the horizontal axis. Time increases from left to right. Signal levels are plotted on the vertical axis. Five signals are shown. From top to bottom, the signals are a row select signal RS, a reset signal RST, a transfer signal TX, a readout reset level signal, and a readout signal level. Each of the signals has a lower level designating that the signal is not asserted and an upper level designating that the signal is asserted.

The following example embodiment of signal timing may be applied to each of an active pixel and a reference pixel. Before time t0, the row select signal RS may be asserted and maintained until after time t3. At time t0, the reset signal RST is asserted, for example, to reset a floating diffusion node FD to a high voltage or reset level. At time t0, the readout reset level signal is also asserted and is maintained until time t1. At time t1, the reset level on the floating diffusion node FD is read (e.g., on the de-assertion edge of the read reset level signal). In one embodiment, the reset levels of both the active and reference pixels may be read concurrently at time t1. It is possible to read one level at time t1 and another level at a time very close to but slightly different than time t1, but noise may be introduced between these different times.

At time t2, the transfer signal TX is asserted to transfer the image signal or charge from the photosensitive element PE to the floating diffusion node FD. A transfer signal TX suppressed reference pixel embodiment is disclosed below, which may omit asserting the transfer signal TX to the reference pixel at time t2, but the transfer signal TX may be asserted for other embodiments of reference pixels disclosed herein. After the transfer signal TX is de-asserted, the readout image signal level signal is asserted. At time t3, the image signal level is read. In one embodiment, the image signal levels of both the active and reference pixels may be read concurrently at time t3 (e.g., on the de-assertion edge of the readout image signal level). The difference in time between times t1 and t3 may represent the amount of time in conventional CDS over which variations or fluctuations in electrical signals may occur that introduce temporally uncorrelated noise.

It is to be appreciated that FIG. 5 illustrates only one illustrative example embodiment of suitable timing for reading or sampling reset levels and image signal levels. Alternate timings are also suitable. For example, in one alternate embodiment (e.g., suitable for a conventional three transistor (3T) pixel), a reset level may be readout after an image signal level is readout.

Figure 6:
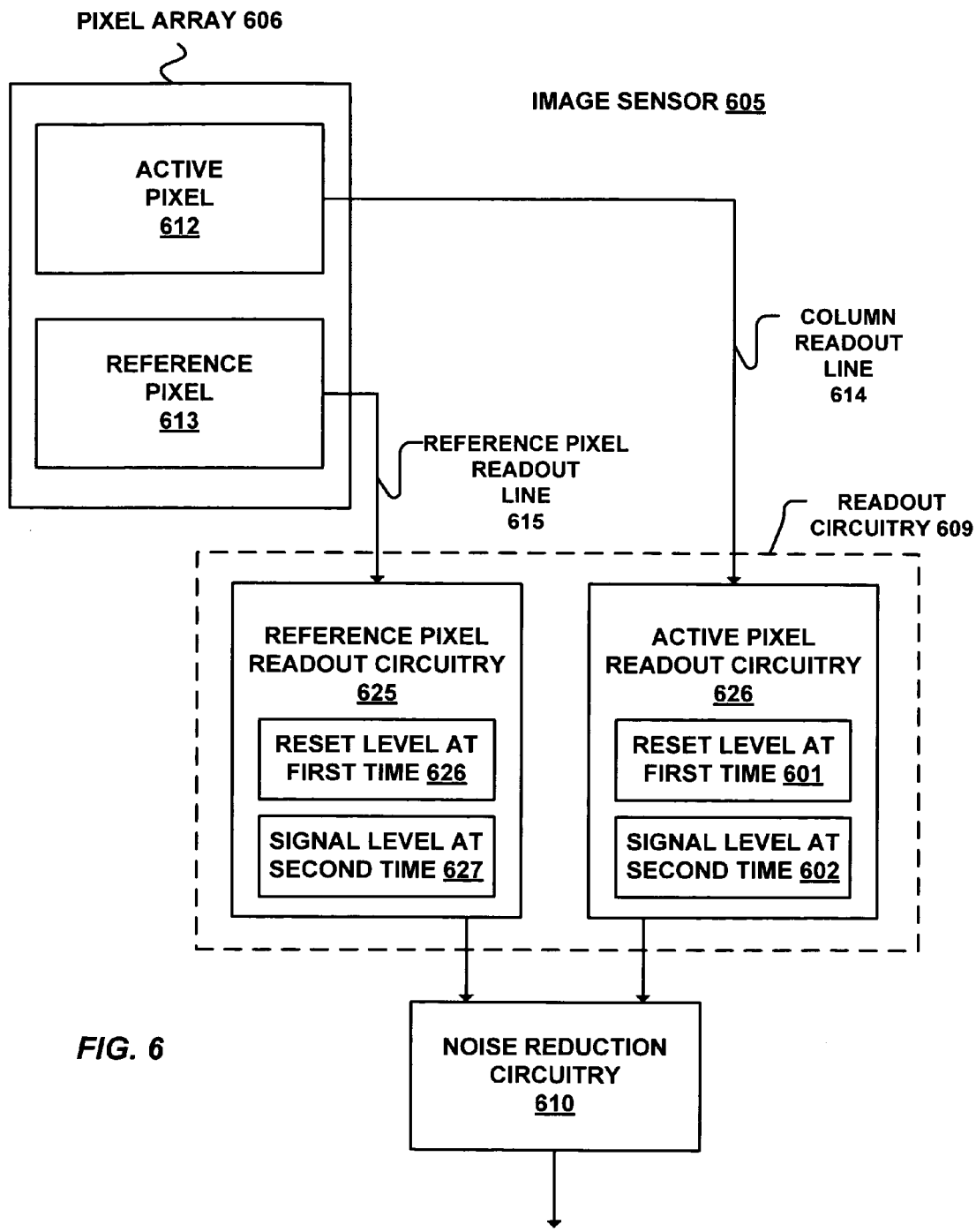
FIG. 6 is a block diagram of an example embodiment of an image sensor.

FIG. 6 is a block diagram of an example embodiment of an image sensor 605. In one embodiment, the image sensor 605 may performed the method 420 of FIG. 4, or a similar method. Alternatively, the image sensor 605 may perform a method entirely different than the method 420 of FIG. 4.

The image sensor includes a pixel array 606. The pixel array includes at least an active pixel 612 and a reference pixel 613. Several example embodiments of different types of suitable reference pixels will be discussed further below. In one embodiment, the pixels may be those used in Complementary Metal Oxide Semiconductor (CMOS) image sensors. In another embodiment, the pixels may be those used in Charge-Coupled Device (CCD) image sensors, or other types of image sensors.

In one embodiment, the active pixel 612 and the reference pixel 613 may be in the same column of the pixel array 606. The reference pixel may be used for the entire column (e.g., may be readout repeatedly for all of the active pixels in all of the rows for that column). Each column of the pixel array may similarly have a corresponding reference pixel that is used for that column. For example, the pixel array may include a single row of reference pixels (e.g., the first row or the last row). In another embodiment, the pixel array may have more than one row of reference pixels. For example, a first row of reference pixels (e.g., the top row) may be used for a first subset of the pixels (e.g., pixels in a subset of the columns, or pixels of a subset of color(s), for example all green pixels), and a second row of reference pixels may be used for a second subset of the pixels (e.g., pixels in a different subset of the columns, or pixels of a different subset of color(s), for example, all red and blue pixels). This may be useful for double-sided readout, for example. In yet another embodiment, the pixel array may have less than a full row of reference pixels and/or less reference pixels than columns. For example, every other column may have a reference pixel, or a single reference pixel, or small set of reference pixels, may be shared by all of the columns. When using a single reference pixel, or small set of reference pixels, effort may optionally be made to make the load on the reference pixels similar to that of the active pixels to help improve noise reduction. It is also to be appreciated that reference pixels may be distributed throughout the pixel array, for example dispersed throughout different rows, rather than all being in a single row.

Referring again to the illustration, the image sensor also includes readout circuitry 609. The readout circuitry is coupled with the active and reference pixels. The readout circuitry is operable to readout a reset level 601 of the active pixel 612, and concurrently, readout a reset level 626 of the reference pixel 613. The readout circuitry is also operable to readout an image signal level 602 of the active pixel 612, and concurrently, readout an image signal level 627 of the reference pixel 613.

As shown, in one embodiment, the readout circuitry includes reference pixel readout circuitry 625 and active pixel readout circuitry 626. The active pixel is coupled with the active pixel readout circuitry by a column line, bit line, or active pixel readout line 614. The reference pixel is coupled with the reference pixel readout circuitry by a reference pixel readout line 615. The reference pixel readout circuitry conducts or reads out the reset and image signal levels of the reference pixel. The active pixel conducts or reads out the reset and image signal levels of the active pixel.

Various different types of conventional readout circuits may be used for each of the reference pixel and active pixel readout circuits. By way of example, each readout circuit may have one or more of a readout bias transistor, an amplifier, an optional sample and hold circuit, and an analog-to-digital converter (ADC), a same set of switches and multiplexors, etc. In one embodiment, in order to help make their noise attributes more comparable, the readout circuits for the active and reference pixels may have a same set of corresponding circuitry components (e.g., each have a readout bias transistor, an amplifier, an optional sample and hold circuit, and an analog-to-digital converter (ADC), a same set of switches and multiplexors, etc.). In one aspect, corresponding circuitry components may have identical or at least similar characteristics (e.g., designs, sizes, capacitances and other electrical properties, etc). In one aspect, the readout circuits for the active and reference pixels, or at least corresponding components thereof, may be identical or substantially identical. In one aspect, the layout of the readout circuitry of the active and reference pixels may be interlaced, dispersed within one another, overlap in extent within a substrate, or otherwise be intermingled. This may help to make the noise for both sets of circuitry be similarly affected by regional fixed pattern noise and/or more correlated.

Referring again to FIG. 6, the image sensor also includes noise reduction circuitry 610. The noise reduction circuitry is coupled with the readout circuitry 609. The noise reduction circuitry operable to receive the reset levels 601, 626 and the image signal levels 602, 627 from the readout circuitry. The noise reduction circuitry is operable to generate a reduced noise image signal level of the active pixel based on the reset levels and the image signal levels of the active and reference pixels. In one embodiment, the noise reduction circuitry may include subtraction logic, differential comparison logic, differential amplification logic, or other noise reduction logic with or without analog-to-digital (ADC) conversion to subtract, compare, or otherwise reduce noise in the reset levels, the image signal levels, and between the reset and image signal levels. Example embodiments of suitable noise reduction logic will be disclosed further below.

In one embodiment, the readout circuitry 609 and the noise reduction circuitry 610 may correspond to one given column. In one aspect, each column of the pixel array may have a similar corresponding readout circuitry and noise reduction circuitry. In one aspect, readout of the active and reference pixels may be performed in parallel for all columns, although column parallel readout is not required. Alternatively, there may be more or less reference pixels and corresponding reference pixel readout circuitry than columns, as mentioned above.

Various different example embodiments of suitable reference pixels are contemplated. In one embodiment, the reference pixels may not acquire a substantial image signal or image charge during an image acquisition phase. In another embodiment, a substantial image signal or image charge may not be transferred out of the reference pixels to readout circuitry and/or noise reduction circuitry during a pixel sampling phase. As used herein, "substantially" no image signal or image charge encompasses certain signal or charge in an image signal level of a reference pixel due to noise (i.e., the signal or charge is attributable noise rather than to photogenerated electrons within the reference pixel).

A first example embodiment of a suitable reference pixel is one in which a transfer signal TX is suppressed, not asserted, or not applied, during a pixel sampling phase. In this embodiment, the reference pixel may optionally have a fully operable photosensitive element (e.g., a pinned photodiode or charge coupled device) that is operable to acquire an image signal or charge (e.g., through photogenerating electrons) when exposed to light. However, in one embodiment, the image signal or charge acquired by the photosensitive element of the reference pixel may not be transferred from the photosensitive element to a reference pixel readout line and/or reference pixel readout circuitry during a pixel sampling phase. For example, in one embodiment, a transfer signal TX may not be pulsed or asserted on a transfer gate of the reference pixel during the pixel sampling phase. In contrast, such a transfer signal TX may be asserted or applied to the transfer gates of active pixels during the pixel sampling phase. That is, the transfer signal TX may be asserted on the active pixels to transfer image signal or image charge from the photosensitive elements, without asserting the transfer signals TX on the reference pixel. A controller of the image sensor (e.g., the controller 207 in FIG. 2), or other transfer gate TX assertion control logic of the image sensor, may be operable to selectively apply the transfer signal TX to the active pixel during the pixel sampling phase, while suppressing or not applying the transfer signal TX to the reference pixel during the pixel sampling phase. Not applying the transfer signal TX on the reference pixels during the pixel sampling phase may help to prevent an image signal or image charge due to photogenerated electrons from being subtracted from the image signal or image charge of the active pixels. It is to be appreciated that some limited image signal or image charge may leak through despite the transfer signal TX not being applied to the reference pixel, and "substantially" no image signal or charge is intended to encompass such unintentional and undesired image signal or charge being transferred. During a shutter phase, in one embodiment, the transfer signal TX may be pulsed or asserted on the reference pixel, in order to reset the reference pixel, for example reset the photodiode to help reduce blooming.

A second example embodiment of a suitable reference pixel is one having an inoperable photosensitive element that is inoperable to generate and/or hold a substantial image signal or image charge. The inoperable photosensitive element may have its photogeneration capability and/or its photogenerated charge holding capability rendered inoperable. That is, the photosensitive element may be incapacitated, null, void, or otherwise inoperable. In one embodiment, the photosensitive element may be a photodiode and an implant of the photodiode may be blocked or otherwise inoperable to hold a photogenerated charge. In another embodiment, the photosensitive element may be blacked out (e.g., have a light-impenetrable permanent cover over the photosensitive element). As before, a transfer signal TX may be applied to an active pixel during a pixel sampling phase to transfer an image charge from a photosensitive element of the active pixel, and likewise a transfer signal TX may also be applied to the reference pixel during the pixel sampling phase. Advantageously, asserting or applying the transfer signal TX to the both the active and reference pixels helps the reference pixel to better mimic or mirror the active pixel, and it is contemplated that this may also help to allow noise introduced through the transfer signal to be better correlated and therefore removed or cancelled. For example, the effect of charge injection on the transfer signal TX may be recorded in the reference pixel and may be better matched to the active pixel. Since the photosensitive element of the reference pixel is inoperable to generate and/or hold a substantial image charge, when the transfer signal TX is asserted or applied to the reference pixel, substantially no image signal or charge may be transferred from the inoperable photosensitive element to a floating diffusion node FD or otherwise. This may help to prevent an image signal or image charge due to photogenerated electrons from the reference pixel from being subtracted or deducted from an image signal or image charge of the active pixel. It is to be appreciated that some limited photogenerated charge may be generated and/or held by the reference pixel despite efforts to prevent it, and "substantially" no image signal or charge is intended to encompass such unintentional and undesired image signal or charge remaining in an otherwise inoperable photosensitive element.

These are just a few illustrative examples of suitable embodiments of reference pixels. Other embodiments are also contemplated. For example, a third example embodiment of a reference pixel may have both an inoperative photosensitive element and a suppressed transfer signal TX during a pixel sampling phase. As another example, a fourth example embodiment of a reference pixel may entirely omit a photosensitive element. Still other embodiments of suitable reference pixels will be apparent to those skilled in the art and having the benefit of the present disclosure.

Figure 7:
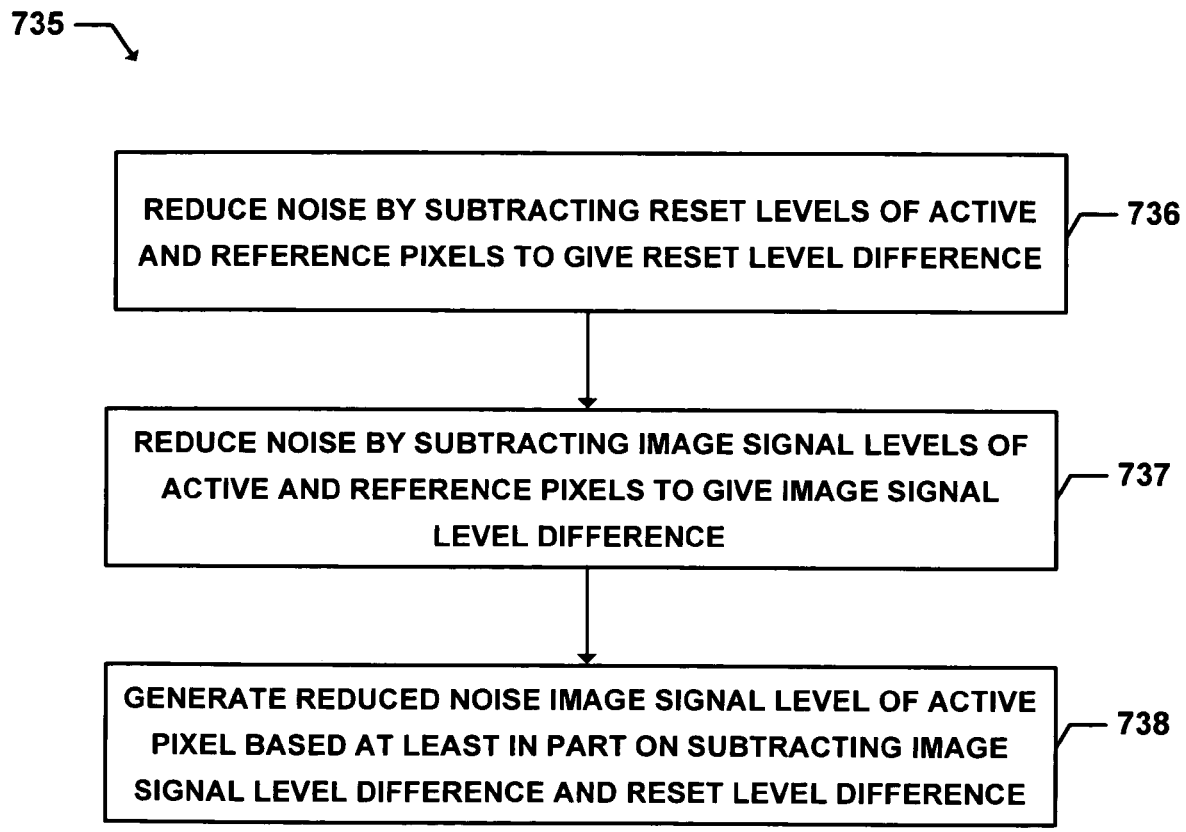
FIG. 7 is a block flow diagram of an example embodiment of a method of generating a reduced noise image signal level of an active pixel based on reset levels and image signal levels of the active pixel and a reference pixel.

FIG. 7 is a block flow diagram of an example embodiment of a method 735 of generating a reduced noise image signal level of an active pixel based on reset levels and image signal levels of the active pixel and a reference pixel. In one embodiment, the method 735 may be performed by the noise reduction circuitry 210 of FIG. 2, or the noise reduction circuitry 610 of FIG. 6, or a similar noise reduction circuitry. Alternatively, the method 735 may be performed by entirely different noise reduction circuitry.

Noise is reduced by subtracting with circuitry reset levels of the active and reference pixels to give a reset level difference, at block 736. The subtraction may be performed using various ways of subtracting or differencing electrical signals known in the art (e.g., differential comparators, differential amplifiers, global subtracting analog-to-digital (ADC) converters, conventional subtraction circuits used in CDS, etc.). Subtracting the reset levels of the active and reference pixels helps to reduce noise, for example, instantaneous noise affecting the reset levels of both the active and reference pixels present at the time the reset levels were concurrently sampled (e.g., temporally correlated noise affecting both reset levels). By way of example, the subtraction of these reset levels may help to cancel out much of the aforementioned row temporal noise that is problematic to CDS, since the sampling happens at the same time.

Noise is reduced by subtracting with circuitry the image signal levels of the active and reference pixels to give an image signal level difference, at block 737. Subtracting the image signal levels of the active and reference pixels helps to reduce noise, for example, instantaneous noise affecting the image signal levels of both the active and reference pixels that is present at the time the image signal levels were concurrently sampled (e.g., temporally correlated noise affecting both image signal levels). As previously discussed, the image signal level of the reference pixel may have noise but have substantially no image signal level or image charge due to photogenerated electrons.

The reduced noise image signal level of the active pixel is generated based at least in part on subtracting with circuitry the image signal level difference and the reset level difference, at block 738. Subtracting the image signal level difference and the reset level difference helps to reduce additional noise that is correlated between the image signal level difference and the reset level difference even though these two differences are based on values read or sampled at two different times. In one embodiment, this subtraction may be performed similarly to that of digital CDS. Advantageously, fixed pattern noise may be reduced by each of the subtractions. From this point, since after the digital CDS, signals are in the digital domain, very little if any additional row noise will be introduced except for perhaps some quantization noise.

Figure 8:
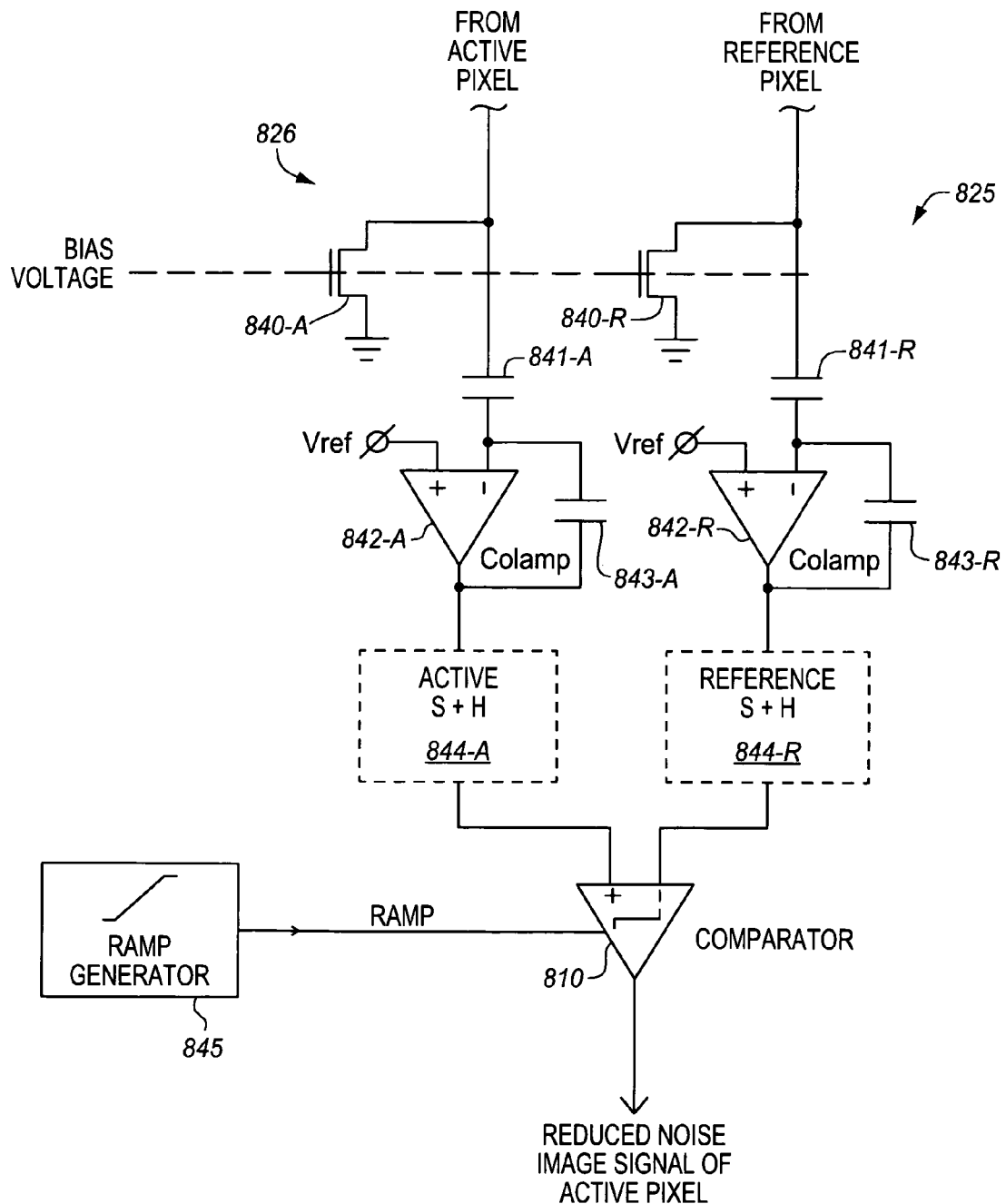
FIG. 8 is a circuit block diagram of an example embodiment of active pixel readout circuitry and reference pixel readout circuitry.

FIG. 8 is a circuit block diagram of an example embodiment of active pixel readout circuitry 826 and reference pixel readout circuitry 825. In one embodiment, the active and reference pixel readout circuitry 826, 825 may be used in the image sensor 605 of FIG. 6, or a similar image sensor. Alternatively, the active and reference pixel readout circuitry 826, 825 may be included in an entirely different image sensor.

In one embodiment, any suitable readout circuitry for an active pixel as known in the arts may also be used for the reference pixel readout circuitry. In the illustrated example embodiment, the active pixel readout circuitry 826 includes a readout bias transistor 840-A, a first capacitor 841-A, an optional column amplifier 842-A, a second capacitor 843-A coupled in parallel with the column amplifier, and an optional sample and hold circuitry 844-A. Similarly, the reference pixel readout circuitry 825 includes a readout bias transistor 840-R, a first capacitor 841-R, an optional column amplifier 842-R, a second capacitor 843-R coupled in parallel with the column amplifier, and an optional sample and hold circuitry 844-R. Each path may also have certain switches and multiplexors and other details that are not illustrated. Any suitable column amplifier may be used. If column gain is not required, the column amplifiers may be omitted.

Noise may be introduced along the path from various sources, such as the pixels, the readout bias transistors, the column amplifiers, the column switches and multiplexers, and electrical signals applied to these components. As previously mentioned, each of these components may be identical or substantially identical (e.g., have identical or substantially identical sizes, designs, electrical properties, etc.) to provide identical or substantially identical noise attributes or paths. The paths for the active and reference pixel readout circuitry join or combine at a comparator 810 having a ramp generator 845 as input. The comparator may represent noise reduction circuitry. The comparator may output a reduced noise image signal of the active pixel.

Figure 9:
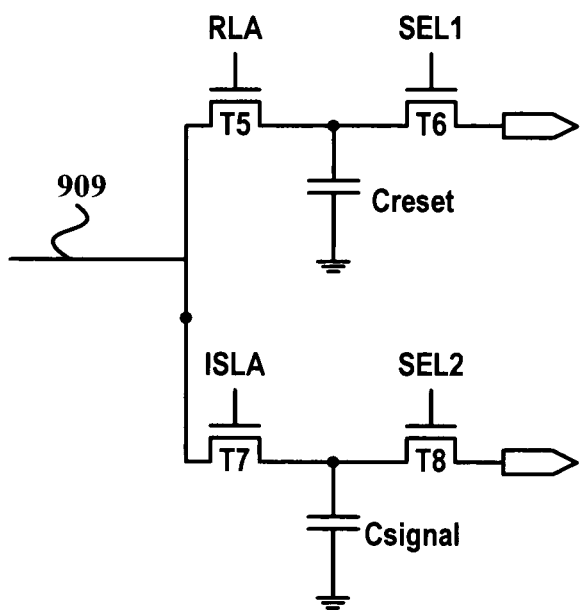
FIG. 9 is a circuit diagram illustrating an example embodiment of suitable sample and hold circuitry.

In one embodiment, sample and hold circuitry is included and used to sample and hold reset and image signal levels for the active and reference pixels. FIG. 9 is a circuit diagram illustrating an example embodiment of suitable sample and hold circuitry 944. In one embodiment, the sample and hold circuitry 944 may be used as the sample and hold circuitry 844-A and 844-R of FIG. 8.

The sample and hold circuitry 944 is operable to sample and hold the reset level and image signal level of a corresponding pixel (i.e., an active or reference pixel). The illustrated embodiment of sample and hold circuitry includes a first hold transistor T5, a reset level hold capacitor Creset, a first select transistor T6, a second hold transistor T7, an image signal level hold capacitor Csignal, and a second select transistor T8. In one embodiment, for an active pixel, the sample and hold circuitry is time shared by the pixels of a column. In one embodiment, for a reference pixel, the sample and hold circuitry is used by the reference pixel for all rows of a column corresponding to the reference pixel.

A reset level may be acquired from the pixel. The reset level may be acquired by asserting a reset level acquire (RLA) signal to the first hold transistor T5 to sample the reset level output from the pixel P on a readout circuitry 909 with reference capacitor Cref. The sampled reset level may subsequently be output from the sample and hold circuitry through the first select transistor T6 under control of a first select signal SEL1 applied thereto.

An image signal level may also be acquired from the pixel. The image signal may be acquired by asserting an image signal level acquire (ISLA) signal to the second hold transistor T7 to sample the image signal level output from the pixel on the readout circuitry 909 with signal capacitor Csignal. The sampled image signal level may subsequently be output from sample and hold circuitry through the second select transistor T8 under control of a second select signal SEL2 applied thereto.

In an alternate embodiment, the sample and hold circuitry may be omitted. In one embodiment, subtractions or other comparisons of the reset levels of the active and reference pixels may be performed in real time as the reset levels are readout. For example, the reset levels of the active and reference pixels may be concurrently readout and provided directly from the readout circuitry to noise reduction logic without going through sample and hold circuitry. The reset levels may be subtracted and a resulting reset level difference may be stored in a memory (e.g., in a static random access memory (SRAM)). In one embodiment, the subtraction of the reset levels involves analog-to-digital conversion (ADC), and the reset level difference is a digital value. Analogously, in one embodiment, subtractions or other comparisons of the image signal levels of the active and reference pixels may be performed in real time as the image signal levels are readout. For example, the image signal levels of the active and reference pixels may be concurrently readout and provided directly from the readout circuitry to noise reduction logic without going through sample and hold circuitry. The image signal levels may be subtracted and a resulting image signal level difference may be stored (e.g., in SRAM).

In one embodiment, the subtraction of the image signal levels involves analog-to-digital conversion (ADC), and the image signal level difference is a digital value. Then, the reset level difference may be subtracted from the image signal level difference in the noise reduction circuitry.

Figure 10:
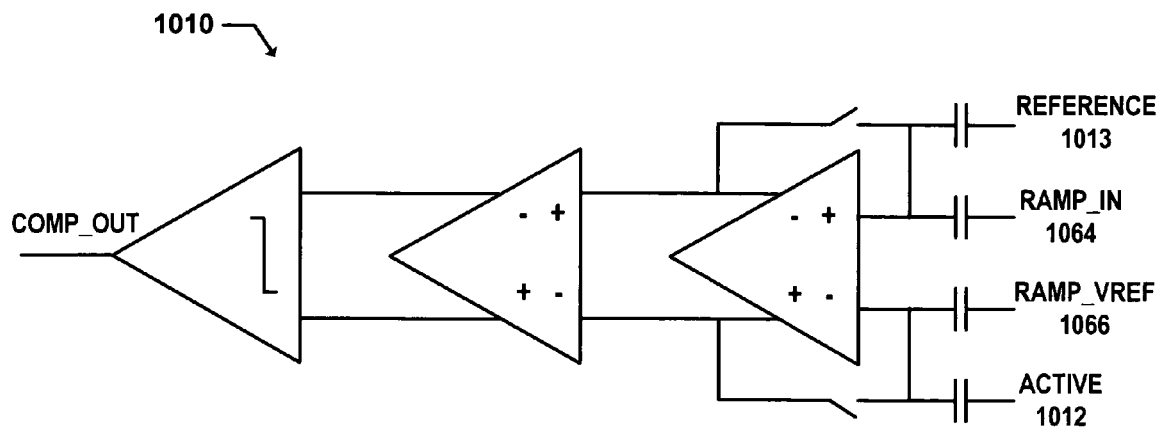
FIG. 10 is a first example embodiment of noise reduction circuitry.

FIG. 10 is a circuit block diagram of a first example embodiment of suitable noise reduction circuitry 1010. This noise reduction circuitry may be used for real-time subtraction of levels readout from on active and reference pixels. The illustrated noise reduction circuitry includes circuitry of a fully differential comparator. The fully-differential comparator has four inputs shown at left. A first input "reference" 1013 is a level from a reference pixel (e.g., a reset or image signal level), a second input "active" 1012 is a level from an active pixel (e.g., a reset or image signal level), a third input "ramp_in" 1064 is a ramp input signal, and a fourth input "ramp_vref" 1066 is a voltage reference for a ramp. The ramp_in and ramp_vref are for ramp ADC conversion, and are not required if ramp ADC is not performed in the comparator. The fully differential comparator is a multiple stage comparator with fully differential input/output first 1068 and second gain stage 1069 and a fully differential input, single-ended output level shifter 1070 as a final stage. The signals of active pixel "active" and reference pixel "reference" are connected to the negative and positive input, respectively. Reset levels from active and reference pixels may be input at one time on the respective "active" and "reference" inputs, subtracted, converted to a digital reset level difference, and output as comparator output "comp_out". Analogously, image signal levels from active and reference pixels may be input at another time on the respective "active" and "reference" inputs, subtracted, converted to a digital image signal level difference, and output as comparator output "comp_out". The digital reset level difference and image signal level difference may be stored and subsequently subtracted in another subtractor. The fully differential comparator help to suppress common mode noise source to help prevent extra noise injection during the subtraction operation.

Figure 11:
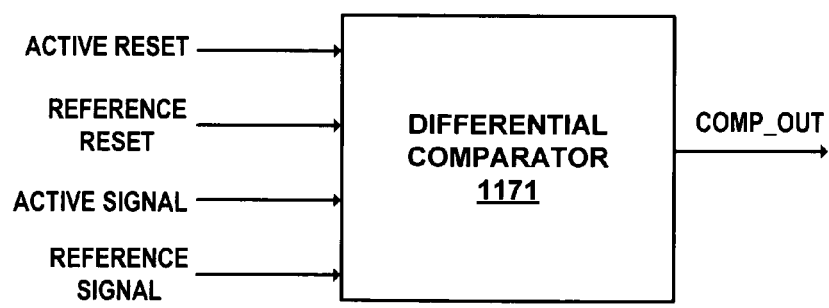
FIG. 11 is a second example embodiment of noise reduction circuitry.

FIG. 11 is a circuit block diagram of a second example embodiment of suitable noise reduction circuitry 1110. The noise reduction circuitry includes one or more differential comparators 1171. This differential comparator(s) may subtract a reset level of an active pixel "active reset," a reset level of a reference pixel "reference reset," an image signal level of the active pixel "active signal," and an image signal level of the reference pixel "reference signal." All four values may be input concurrently (e.g., from sample and hold circuitry) and subtracted.

Figure 12:
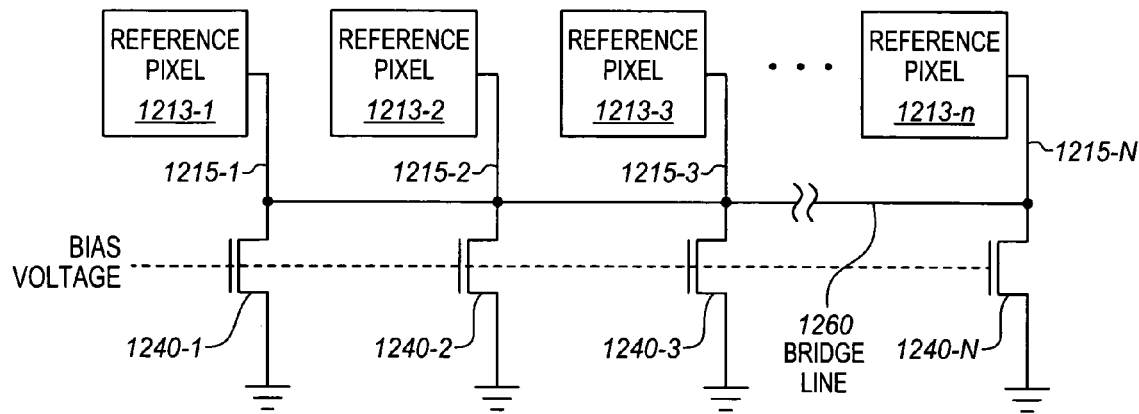
FIG. 12 is a circuit block diagram of an example embodiment of circuitry to moderate reset levels and/or an image signal levels of reference pixels with reset levels and/or image signal levels, respectively, of other reference pixels.

FIG. 12 is a circuit block diagram of an example embodiment of circuitry 1260 to moderate reset levels and/or an image signal levels of reference pixels with reset levels and/or image signal levels, respectively, of other reference pixels. Advantageously, such circuitry may help to avoid increased noise introduced through one or more reference pixels with faulty or defective noise characteristics.

It is possible that one or more reference pixels may have faulty or defective noise characteristics. For example, the faulty or defective reference pixels may have noise characteristics that unintentionally and undesirably do not closely mimic the noise characteristics of the active pixels (e.g., for various reasons the reference pixel may be too sensitive). This may be due to a manufacturing defect. Generally, the likelihood of one or more reference pixels being defective may tend to increase as the number of reference pixels increases.

One challenge is that a reference pixel that has faulty or defective noise characteristics, which do not mimic those of the active pixels, may introduce additional noise into images or video. For example, if there is one reference pixel per column, then a faulty or defective reference pixel may affect a whole column of corresponding active pixels (e.g., cause the whole column of active pixels to be bright, dark, or otherwise have an offset compared to other columns.) This may amount to column-wise fixed pattern noise (FPN).

The circuitry of FIG. 12 may help to mitigate or reduce noise introduced through one or more faulty or defective reference pixels, if they are present. The illustration shows a plurality of reference pixels 1213-1 through 1213-n. In the illustrated embodiment, the reference pixels are arranged in a single row, with one reference pixel per column of the pixel array, although as previously discussed this is not required. Each of the reference pixels has a corresponding reference pixel readout line labeled 1215-1 through 1215-n. Also shown are readout bias transistors 1240-1 through 1240-n operable to read a readout bias reference voltage. These transistors are arranged one per reference pixel. Each of these transistors has a first channel terminal connected to a reference pixel readout line for the corresponding reference pixel and a second channel terminal connected to ground.

As shown, in one embodiment, all of the reference pixel readout lines 1215-1 through 1215-n are coupled together by a single bridge 1260. The bridge may be a line, wire, interconnect, metal structure, conductive structure, etc. In an alternate embodiment, two or more discrete bridge lines may be used to couple different subsets of the reference pixel readout lines together. Electrically coupling the reference pixel readout lines together may help to electrically moderate the reset levels and image signal levels of each of the reference pixels with the respective reset levels and image signal levels of the other coupled reference pixels. Moderating the levels may help to bring extreme, outlying, excessive, or inappropriate levels or values (e.g., due to faulty or defective reference pixels), within more moderate, reasonable, or appropriate limits or bounds, which are more consistent with the levels of the other coupled reference pixels. For levels that are relatively close to one another in magnitude, the circuitry may help to average or mediate the magnitudes of the levels. Levels that are extreme or outlying in magnitude relative to the other levels may be brought close to the other levels thereby essentially filtering away or removing the extreme or outlying levels. This may help to filter away levels for faulty or defective reference pixels.

Figure 13:
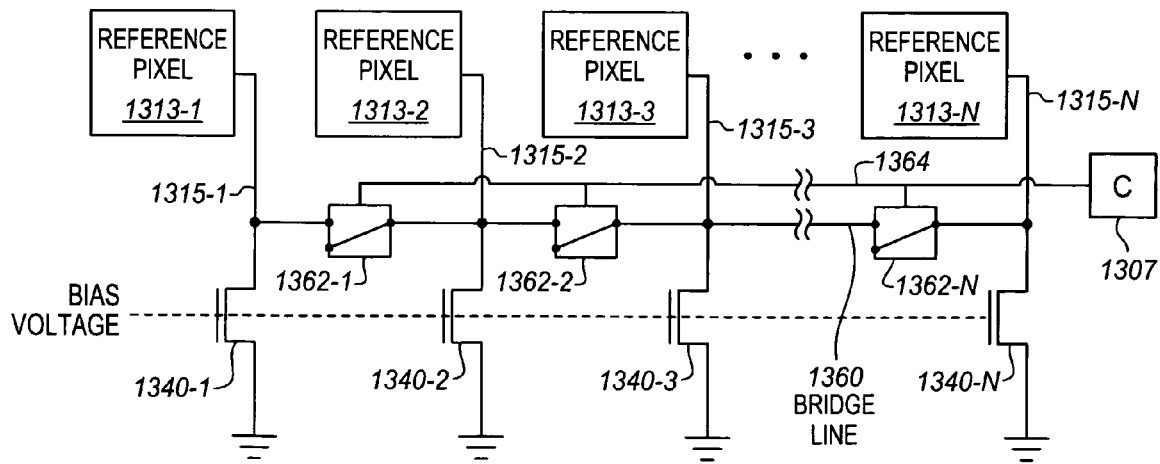
FIG. 13 is a circuit block diagram of an example embodiment of configurable circuitry capable of being configured to moderate or not moderate reset levels and image signal levels of reference pixels with reset levels and image signal levels, respectively, of other reference pixels.

FIG. 13 is a circuit block diagram of an example embodiment of configurable circuitry 1360, 1362, 1364 capable of being configured to moderate or not moderate reset levels and image signal levels of reference pixels with reset levels and image signal levels, respectively, of other reference pixels. The circuitry is similar to the circuitry of FIG. 12, and may optionally have the same or similar characteristics. To avoid obscuring the description, primarily new, additional, or different features of the circuitry of FIG. 13 will be discussed below.

The circuitry includes switches 1362-1 through 1362-*n*, a control line 1364 coupled with the switches, and a controller 1307 to control or configure the switches via the control line. Each of the switches is connected on a bridge 1360 between two adjacent reference pixel readout lines 1315. The switches may be transistors or other switching circuits or elements known in the arts. The controller may configure the switches to be either open or closed. In one aspect, the controller may be the main controller of an image sensor (e.g., controller 207 of FIG. 2). Each switch may potentially be controlled independently of the others, but commonly they will all be controlled together to all be either open or closed to simplify the control logic.

When a switch is closed, it may connect the bridge line between the two corresponding adjacent reference pixel readout lines. When all of the switches are closed, the circuitry may moderate the levels of the reference pixels as mentioned above for FIG. 12. As mentioned, this may help to reduce noise added by a faulty or defective reference pixel. Conversely, when a switch is open, it may essentially break the bridge line between the two corresponding adjacent reference pixel readout lines. When all of the switches are open, the circuitry may not moderate the levels of the reference pixels. Not averaging or moderating the levels of the reference pixels may be desirable, for example, when it is known that none of the reference pixels are faulty or defective, or when the quality is better when levels are not averaged or moderated. Accordingly, each of the switches may be configured to allow or not allow the readout levels of the adjacent connected reference pixels to be moderated or averaged with the readout levels of other reference pixels.

In one aspect, the decision of whether or not to moderate the readout levels of reference pixels with readout levels of other reference pixels may be based on empirical evidence. For example, an image or video may be acquired and inspected for column-wise fixed pattern noise possibly indicative of a faulty or defective reference pixel. As another example, quality of images or video may be assessed both with and without such moderating and the image sensor may be configured according to which provided the better quality. In one aspect, the configuration may be done in the factory prior to product distribution based on calibration or testing (e.g., whether or not there are any defective pixels, whether an acquired image is better with or without averaging, etc.) In another aspect, a user may be allowed to configure and reconfigure whether or not the reference pixels are averaged (e.g., a camera or other image acquisition device may have a button or menu option to allow this feature to be configured).

In the description above and the claims below, the terms "coupled" and "connected," along with their derivatives, are used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other. For example, noise reduction circuitry may be coupled with readout circuitry through one or more intervening components.

In the description above, for the purposes of explanation, numerous specific details have been set forth in order to provide a thorough understanding of the embodiments of the invention. It will be apparent however, to one skilled in the art, that one or more other embodiments may be practiced without some of these specific details. The particular embodiments described are not provided to limit the invention but to illustrate it. The scope of the invention is not to be determined by the specific examples provided above but only by the claims below. In other instances, well-known circuits, structures, devices, and operations have been shown in block diagram form or without detail in order to avoid obscuring the understanding of the description. Where considered appropriate, reference numerals or terminal portions of reference numerals have been repeated among the figures to indicate corresponding or analogous elements, which may optionally have the same or similar characteristics.

It will also be appreciated, by one skilled in the art, that modifications may be made to the embodiments disclosed herein, such as, for example, to the configurations, magnitudes, functions, and manner of operation, of the components of the embodiments. All equivalent relationships to those illustrated in the drawings and described in the specification are encompassed within embodiments of the invention.

Various operations and methods have been described. Some of the methods have been described in a basic form in the flow diagrams, but operations may optionally be added to and/or removed from the methods. In addition, while the flow diagrams show a particular order of the operations according to example embodiments, it is to be understood that that particular order is exemplary. Alternate embodiments may optionally perform the operations in different order, combine certain operations, overlap certain operations, etc.

It should also be appreciated that reference throughout this specification to "one embodiment", "an embodiment", or "one or more embodiments", for example, means that a particular feature may be included in the practice of the invention. Similarly, it should be appreciated that in the description various features are sometimes grouped together in a single embodiment, Figure, or description thereof for the purpose of streamlining the disclosure and aiding in the understanding of various inventive aspects. This method of disclosure, however, is not to be interpreted as reflecting an intention that the invention requires more features than are expressly recited in each claim. Rather, as the following claims reflect, inventive aspects may lie in less than all features of a single disclosed embodiment. Thus, the claims following the Detailed Description are hereby expressly incorporated into this Detailed Description, with each claim standing on its own as a separate embodiment of the invention.

What is claimed is:

1. A method comprising:

reading a reset level of an active pixel with a first readout circuit, and concurrently, reading a reset level of a reference pixel with a second readout circuit, wherein the active pixel and the reference pixel are in a same column of a pixel array, and wherein the first readout circuit is not coupled to readout the reference pixel and the second readout circuit is not coupled to readout the active pixel;

reading an image signal level of the active pixel with a first readout circuit, and concurrently, reading an image signal level of the reference pixel with a second readout circuit, wherein the image signal level of the active pixel is read during a concurrent readout of image signal levels of all active pixels in a row including an active pixel for each column of the pixel array; and generating a reduced noise image signal level of the active pixel with noise reduction circuitry based on the reset levels and the image signal levels of the active and reference pixels, wherein the first readout circuitry is coupled to transfer the reset level of the active pixel and the image signal level of the active pixel to the noise reduction circuitry through the first readout circuitry, and wherein the second readout circuitry is coupled to transfer the reset level of the reference pixel and the image signal level of the reference pixel to the noise reduction circuitry through the second readout circuit.

2. The method of claim 1, wherein generating the reduced noise image signal level of the active pixel comprises:

reducing noise by subtracting with circuitry the reset levels of the active and reference pixels to give a reset level difference;

reducing noise by subtracting with circuitry the image signal levels of the active and reference pixels to give an image signal level difference; and generating the reduced noise image signal level of the active pixel based at least in part on subtracting with circuitry the image signal level difference and the reset level difference.

3. The method of claim 1, wherein the first and second readout circuits each have a same set of components including an amplifier, wherein the reference pixel is never used as an active pixel.

4. The method of claim 1, wherein the first and second readout circuits have intermingled circuitry.

5. The method of claim 1, wherein reading the reset level of the active pixel comprises sampling and holding the reset level of the active pixel with a first sample and hold circuit, and wherein reading the reset level of the reference pixel comprises sampling and holding the reset level of the reference pixel with a second sample and hold circuit, and further comprising reading a reset level of the reference pixel with the second sample and hold circuit while reading a reset level of a second active pixel in a different row and a same column as the active pixel.

6. The method of claim 1, further comprising, after exposing the active pixel to light and prior to reading the image signal levels, applying a transfer signal to the active pixel during a pixel sampling phase to transfer an image charge from a photodetector of the active pixel without applying a transfer signal to the reference pixel.

7. The method of claim 6, further comprising applying a transfer signal to the reference pixel during a shutter phase.

8. The method of claim 1, further comprising, after exposing the active and reference pixels to light and prior to reading the image signal levels, applying a first transfer signal to the active pixel during a pixel sampling phase to transfer an image charge from a photodetector of the active pixel, and applying a second transfer signal to the reference pixel during the pixel sampling phase, wherein the reference pixel has an inoperable photodiode that is inoperable to hold a substantial image charge.

9. The method of claim 1, further comprising moderating the reset level of the reference pixel with a plurality of reset levels of a plurality of additional reference pixels.

10. The method of claim 9, wherein moderating the reset level of the reference pixel with the reset levels of the additional reference pixels comprises electrically connecting the reset level of the reference pixel with the reset levels of the additional reference pixels.

11. The method of claim 9, further comprising configuring one or more switches to one of allow and not allow the reset level of the reference pixel to be moderated with a plurality of reset levels of a plurality of additional reference pixels.

12. The method of claim 1, further comprising:

reading a second reset level of a second active pixel that is in a different row of the pixel array than the active pixel, and concurrently, reading a third reset level of the reference pixel; and reducing noise by subtracting the second and third reset levels.

13. An apparatus comprising:

a pixel array including an active pixel and a reference pixel, wherein the active pixel and the reference pixel are in a same column of the pixel array;

readout circuitry including a first readout circuit coupled to readout the active pixel and a second readout circuit coupled to readout the reference pixel, wherein the first readout circuit is not coupled to readout the reference pixel and the second readout circuit is not coupled to readout the active pixel, the readout circuitry operable to:

(a) readout a reset level of the active pixel, and concurrently, readout a reset level of the reference pixel; and (b) readout an image signal level of the active pixel, and concurrently, readout an image signal level of the reference pixel, wherein the readout circuitry is to readout the image signal level of the active pixel during a concurrent readout of image signal levels of all active pixels in a row of the pixel array including an active pixel for each column of the pixel array; and noise reduction circuitry coupled to receive the reset level of the active pixel and the image signal level of the active pixel through the first readout circuitry and coupled to receive the reset level of the reference pixel and the image signal level of the reference pixel through the second readout circuit, the noise reduction circuitry operable to generate a reduced noise image signal level of the active pixel based on the reset levels and the image signal levels of the active and reference pixels.

14. The apparatus of claim 13, wherein the noise reduction circuitry is operable to:

receive and subtract the reset levels of the active and reference pixels to give a reset level difference;

receive and subtract the image signal levels of the active and reference pixels to give an image signal level difference; and receive and subtract the image signal level difference and the reset level difference.

15. The apparatus of claim 13, wherein each of the first and second readout circuits have a same set of components.

16. The apparatus of claim 15, wherein each of the first and second readout circuits have a readout line and an amplifier.

17. The apparatus of claim 13, wherein the first and second readout circuits having intermingled circuitry.

18. The apparatus of claim 13, further comprising:
a first sample and hold circuit to sample and hold the reset level of the active pixel, and a second sample and hold circuit to sample and hold the reset level of the reference pixel.

19. The apparatus of claim 13, further comprising logic that is operable to apply a transfer signal to the active pixel during a pixel sampling phase to transfer an image charge from a photodetector of the active pixel, without applying a transfer signal to the reference pixel during the pixel sampling phase.

20. The apparatus of claim 19, wherein the logic is operable to applying a transfer signal to the reference pixel during a shutter phase.

21. The apparatus of claim 13, wherein the reference pixel has an inoperable photodiode that is inoperable to hold a substantial image charge.

22. The apparatus of claim 21, further comprising logic that is operable to apply a transfer signal to the reference pixel during a pixel sampling phase.

23. The apparatus of claim 13, further comprising circuitry operable to moderate the reset level of the reference pixel with reset levels of additional reference pixels.

24. The apparatus of claim 23, wherein the circuitry operable to moderate the reset level of the reference pixel comprises circuitry operable to electrically couple the reset level of the reference pixel with the reset levels of the additional reference pixels.

25. The apparatus of claim 24, wherein the circuitry operable to moderate the reset level of the reference pixel comprises one or more switches operable to be configured to allow or not allow the reset level of the reference pixel to be moderated with a plurality of reset levels of a plurality of additional reference pixels.

26. The apparatus of claim 13, further comprising a plurality of reference pixels in a same row of the pixel array as the reference pixel, wherein each of the reference pixels is used for a plurality of active pixels each in a different row and each in a same column.

27. The apparatus of claim 13, further comprising:
one or more lenses optically coupled to focus light on the pixel array;
a shutter optically coupled to allow light to pass through the one or more lenses;
a processor to process image data; and
a memory to store image data.

28. The apparatus of claim 13 further comprising a second reference pixel in a second row of reference pixels, wherein the reference pixel is in a first row of reference pixels different from the second row of reference pixels, the readout circuitry further operable to:
readout the second reference pixel concurrently with reading out a second active pixel in a second column different from said same column.

29. An apparatus comprising:
a pixel array including an active pixel and a reference pixel, wherein the reference pixel is in a same column as the active pixel;
readout circuitry including a first readout circuit coupled to readout the active pixel and a second readout circuit coupled to readout the reference pixel, wherein the first readout circuit is not coupled to readout the reference pixel, and the second readout circuit is not coupled to readout the active pixel, the readout circuitry operable to:
(a) readout a reset level of the active pixel, and concurrently, readout a reset level of the reference pixel; and
(b) readout an image signal level of the active pixel, and concurrently, readout an image signal level of the reference pixel; and
noise reduction circuitry coupled to receive the reset level of the active pixel and the image signal level of the active pixel through the first readout circuitry and coupled to receive the reset level of the reference pixel and the image signal level of the reference pixel through the second readout circuit, the noise reduction circuitry operable to generate a reduced noise image signal level of the active pixel based on the reset levels and the image signal levels of the active and reference pixels.

30. The apparatus of claim 29, wherein the readout circuitry is operable to:
(a) readout a reset level of a second active pixel that is in a different row and the same column as the reference pixel, and concurrently, readout a reset level of the reference pixel; and
(b) readout an image signal level of the second active pixel, and concurrently, readout an image signal level of the reference pixel.

* * * * *